United States Patent
Welland et al.

(10) Patent No.: US 7,337,443 B2
(45) Date of Patent: Feb. 26, 2008

(54) METHOD AND APPARATUS FOR PROCESSING PROGRAM THREADS

(75) Inventors: Robert V. Welland, Seattle, WA (US); Galen C. Hunt, Bellevue, WA (US); Dimitris Achlioptas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 942 days.

(21) Appl. No.: 10/610,314

(22) Filed: Jun. 30, 2003

(65) Prior Publication Data

US 2004/0268350 A1    Dec. 30, 2004

(51) Int. Cl.
*G06F 9/46* (2006.01)
*G06F 9/455* (2006.01)
*G06F 15/00* (2006.01)
*G06F 15/76* (2006.01)

(52) U.S. Cl. ............ 718/102; 718/103; 718/104; 712/26; 712/41

(58) Field of Classification Search ............ 718/100, 718/102, 103, 104, 107; 712/26, 41, 226, 712/28
See application file for complete search history.

(56) References Cited

U.S. PATENT DOCUMENTS

| | | | |
|---|---|---|---|
| 5,630,128 A * | 5/1997 | Farrell et al. ............... | 718/103 |
| 5,724,586 A * | 3/1998 | Edler et al. ............... | 718/102 |
| 5,881,308 A | 3/1999 | Dwyer, III | |
| 6,049,867 A * | 4/2000 | Eickemeyer et al. ........ | 712/228 |
| 6,070,009 A * | 5/2000 | Dean et al. ............... | 717/130 |
| 6,292,934 B1 | 9/2001 | Davidson et al. | |
| 6,487,640 B1 | 11/2002 | Lipasti | |
| 6,549,930 B1 * | 4/2003 | Chrysos et al. ............ | 718/104 |
| 6,738,893 B1 * | 5/2004 | Rozas ........................ | 712/24 |
| 6,981,258 B1 * | 12/2005 | Takakura ................... | 718/102 |
| 7,089,557 B2 * | 8/2006 | Lee ........................... | 718/102 |
| 2004/0128401 A1 * | 7/2004 | Fallon et al. .............. | 709/250 |

OTHER PUBLICATIONS

James Philbin, Thread scheduling for cache locality, Dec. 1996, ACM SIGOPS Operating Systems Review, vol. 30 Issue 5.*
Larus, et al.; "EEL: Machine-Independent Executable Editing"; SIGPLAN '95 La Jolla, CA; 1995; ACM 0-89791-697-2.

* cited by examiner

Primary Examiner—Meng-Al T. An
Assistant Examiner—Abdullah-Al Kawsar
(74) Attorney, Agent, or Firm—Lee & Hayes, PLLC

(57) ABSTRACT

A procedure identifies a program image and generates a basic block flow graph associated with the program image. Execution of the program image is benchmarked and the basic block flow graph is annotated with the results of the benchmarking of the program image. Basic blocks of the program are then grouped into bins. When the program image is executed, a drafting scheduler stops threads before they leave a bin and schedules any threads queued for the same bin.

16 Claims, 7 Drawing Sheets

METHOD AND APPARATUS FOR PROCESSING PROGRAM THREADS

TECHNICAL FIELD

The systems and methods described herein relate to processing and scheduling multiple program threads to enhance the efficiency of processor resources.

BACKGROUND

Computer systems and/or operating systems execute multiple threads sequentially or in parallel. A thread is an execution across a portion of a program containing a series of instructions or steps to be performed. A thread may also be referred to as a portion of a program that can execute independently of other parts of the program. In a multi-threading architecture, two or more different parts of a program are executed simultaneously.

A variety of different computer systems handle multiple parallel requests for information or services. For example, web servers often receive multiple requests simultaneously or nearly simultaneously. Many of these requests can relate to similar or identical data, such as a particular web page or other information.

Computer systems typically include one or more caches, such as a data cache and an instruction cache. A cache is a high speed storage mechanism logically interposed between a lower and a higher member of a computer system's memory hierarchy. For example, a cache may be positioned between the computer system's main memory and processors. Typical programs executing on a computer system access the same data or instructions repeatedly. By storing this information in a cache, the overall performance of the computer system is enhanced because the information is retrieved from a faster cache rather than a slower storage device (such as a DRAM (Dynamic Random Access Memory) or a disk drive).

A typical cache stores data that has recently been requested by a program. When the program requests data or instructions, the computer system first checks the cache to see if the requested information is already in the cache. If so, the data is provided from the cache. Otherwise, the requested data is retrieved from a slower storage device, provided to the requesting program and stored in the cache for future data or instruction requests. When data is found in a cache, it is referred to as a "cache hit"; when data is not found in a cache, it is referred to as a "cache miss". The effectiveness of a cache is determined by the cache "hit rate", which is the rate (or frequency per number of attempts) at which data is found in the cache.

The effectiveness of a cache is typically diminished as a result of a context switch to a new thread. A context switch occurs when a multi-tasking system stops running one process (or thread) and starts running another process (or thread). After a particular thread has been running for some time, the associated cache contains data that is useful to that particular thread because threads tend to exhibit temporal locality in which they access the same data or instructions repeatedly. When a context switch to a new thread occurs, the cache data is replaced over time with data that is useful to the new thread. As the cache data is being replaced after a context switch, the hit rate of the cache is generally diminished.

Accordingly, it is desirable to reduce context switching in a computer system to enhance the effectiveness of a cache.

SUMMARY

The systems and methods described herein handle the processing and scheduling of multiple threads to increase cache hit rates. In a particular embodiment, a process identifies a program image and generates a basic block flow graph associated with the program image. The process then benchmarks execution of the program image and annotates the basic block flow graph with results from the benchmark execution of the program image. Basic blocks of the program are grouped into bins. A list of scheduling points is associated with the program image labeling the exit points from bins.

In one embodiment, when the program image is run, a drafting scheduler stops threads before they leave a bin and schedules any threads queued for the same bin. Successor threads experience increased cache locality as they execute cached code from the same bin as the first thread.

BRIEF DESCRIPTION OF THE DRAWINGS

Similar reference numbers are used throughout the figures to reference like components and/or features.

DETAILED DESCRIPTION

Figure 1:
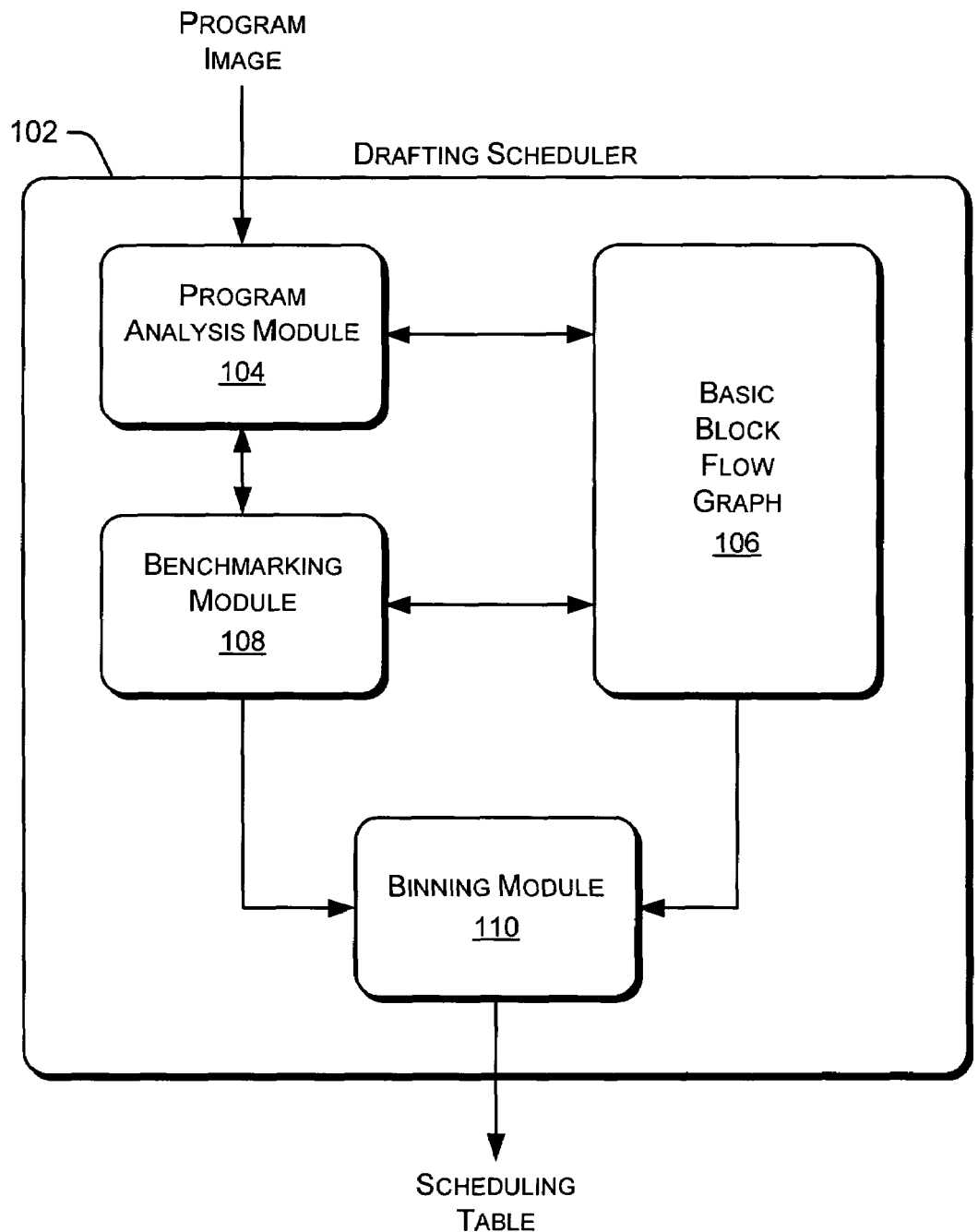
FIG. 1 is a block diagram illustrating an embodiment of a drafting scheduler.

The systems and methods described herein relate to processing multiple program threads to improve the use of processor resources, such as processor caches. This improvement is accomplished by grouping basic code blocks based on their temporal locality. Threads are scheduled so that all threads running the same group of basic blocks, called a bin, execute in succession. The successor threads experience a higher cache hit rate as the earlier threads have already brought instructions from the common code path into the cache and intervening threads have not had the opportunity to run and eject the common instructions from the cache. The systems and methods discussed herein take advantage of commonalities between multiple threads or multiple requests for information.

As used herein, a thread is an execution across a portion of a program containing a series of instructions or steps to be performed, such as a program segment, a sequence of instructions, or a sequence of steps that can be executed by a processor or other device. In certain embodiments, each thread can execute independently of other parts of the program.

Particular examples discussed herein refer to one or more threads executed by a processor. In alternate embodiments, the systems and methods described herein can be applied to any mechanism that executes similar instructions or processes multiple similar requests (such as web server requests or database server requests) that are not interdependent on one another.

Generally, the systems and methods discussed herein control the execution of program threads so that individual threads execute groups of basic code blocks, called a bin, in memory based on their historic temporal locality. Sets of threads are scheduled such that threads executing within the same bin are run in succession. A program image is analyzed to determine the manner in which the program's basic code blocks are to be placed into bins. The grouping of basic code blocks into bins is performed such that the use of one or more processor caches is enhanced.

A drafting scheduler is a mechanism for improving the use of processor caches by enhancing the locality of reference of a set of threads that run similar or identical code. The threads do not necessarily run in lock step nor do they necessarily run against the same data. The drafting scheduler utilizes three basic components, as discussed in greater detail below. First, benchmark data is gathered at the level of basic blocks. This benchmark data is presumed to represent the typical behavior of the program. A second component uses the benchmark data to group the basic blocks into bins. This second component attempts to cluster program code that has temporal locality into bins that are approximately the same size as the processor cache. A list of scheduling points marking the exit points from the bins is created and associated with the program image. These scheduling points capture control from a thread when the thread attempts to leave a given bin.

A third component is used at runtime. This component gains control at the scheduling points and schedules threads that are executing in similar bins. This scheduling improves the performance of the threads running in the same bin because the cost of loading the cache is spread across many threads instead of a single thread.

FIG. 1 is a block diagram illustrating an embodiment of a drafting scheduler 102. Drafting scheduler 102 includes a program analysis module 104 coupled to a benchmarking module 108. Program analysis module 104 receives a program image (also referred to as a program file), typically represented by source code or object code. Program analysis module 104 analyzes the program image and generates a basic block flow graph 106 representing the execution of the program image. Basic block flow graph 106 contains multiple blocks, each of which is a linear sequence of code having an entry point and one or more exit points. This analysis can be applied against the source code (similar to a compiler) or against an executable image. Example programs capable of performing this analysis include ATOM, EEL, and Vulcan. Information regarding ATOM is available in Western Research Laboratory Research Report 94/2, entitled "ATOM: A System for Building Customized Program Analysis Tools". Information regarding EEL is available in "Proceedings of the ACM SIGPLAN'95 Conference on Programming Language Design and Implementation (PLDI)", pp. 291-300, Jun. 18-21, 1995. Information regarding Vulcan is available in Microsoft Research Technical Report MSR-TR-2001-50, dated April 2001, entitled "Vulcan: Binary transformation in a distributed environment".

Benchmarking module 108 receives data from basic block flow graph 106. Benchmarking module 108 runs a representative set of data (also referred to as "test data") against the program and annotates basic block flow graph 106 with observed performance information. Programs such as ATOM, EEL, and Vulcan (mentioned above) can be used to perform these functions. Exemplary information annotated includes the size of each basic block, the number of times each basic block was entered and the percentage of time the basic block exited each alternate path. The percentage of time the basic block exited an alternate path would be 100% in the case of an unconditional branch, and two or more numbers summing to 100% in the case of two or more conditional branches.

A binning module 110 is coupled to benchmarking module 108 and basic block flow graph 106. Binning module 110 uses the annotated basic block flow graph to group sets of basic blocks typically executed with temporal proximity into a bin. Scheduling points are associated with instructions that cause execution to exit a bin. The scheduling points are used at runtime to control the execution order of the multiple threads. The output of binning module 110 is a scheduling table that identifies each of the scheduling points associated with the program image.

Figure 2:
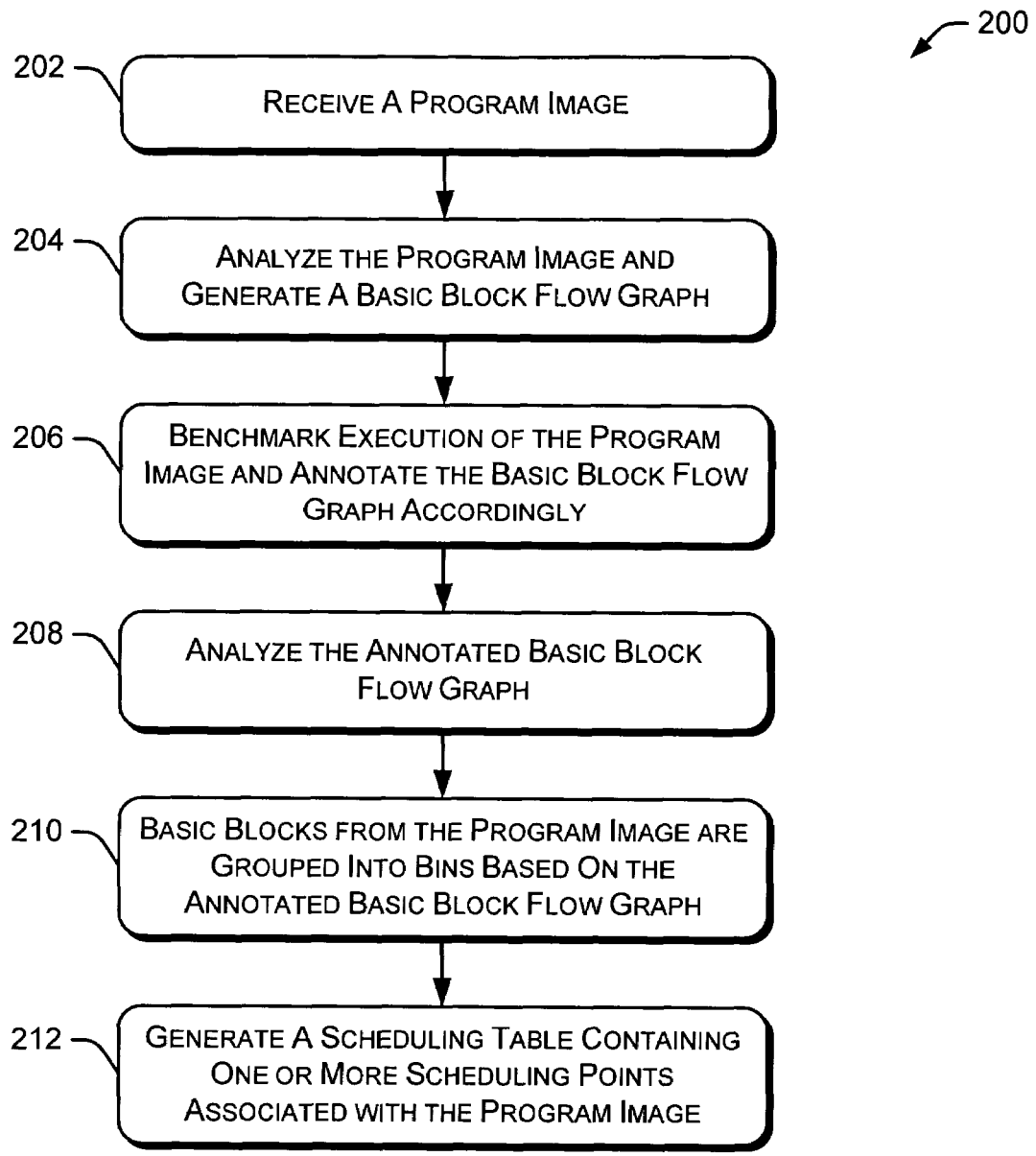
FIG. 2 is a flow diagram illustrating an embodiment of a procedure for processing a program image.

FIG. 2 is a flow diagram illustrating an embodiment of a procedure 200 for processing a program image. Initially, a program image is received (block 202) or retrieved, for example, from a storage device. The procedure analyzes the program image and generates a basic block flow graph (block 204). Procedure 200 then benchmarks execution of the program image and annotates the basic block flow graph accordingly (block 206). The annotation information includes, for example, the size of each basic block, the number of times each basic block was entered (or accessed) and the percentage of time the program exited the basic block using each alternate exit path.

The procedure then analyzes the annotated basic block flow graph (block 208). Basic blocks from the program image are grouped into bins based on the annotated basic block flow graph (block 210). Finally, the procedure generates a scheduling table containing one or more scheduling points associated with the program image (block 212).

Figure 3:
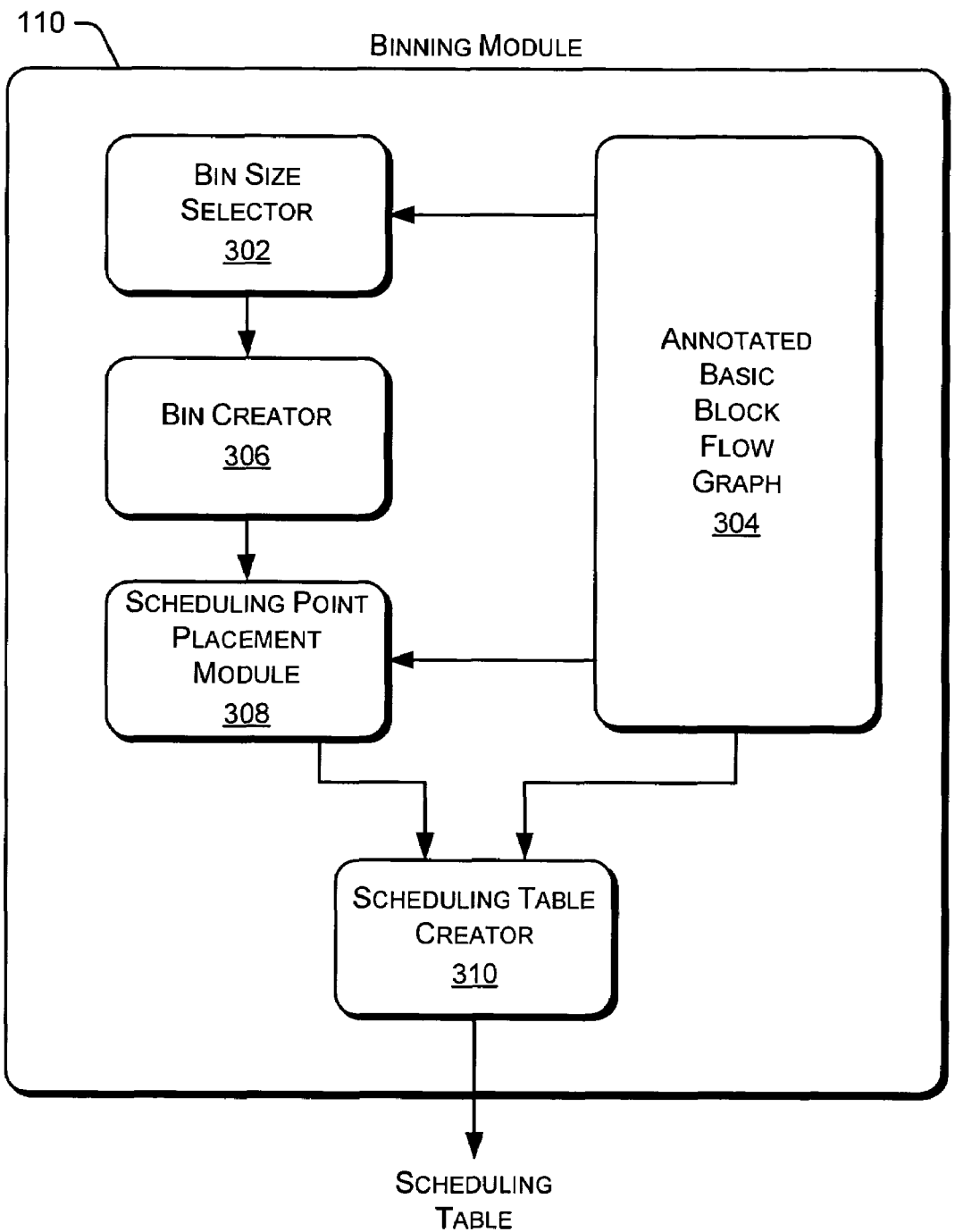
FIG. 3 is a block diagram illustrating an embodiment of a binning module.

FIG. 3 is a block diagram illustrating an embodiment of binning module 110 shown in FIG. 1. Binning module 110 includes a bin size selector 302 coupled to an annotated basic block flow graph 304. The program image is divided into multiple bins. Each bin is approximately the size of the processor cache. Thus, bin size selector 302 determines the size of the processor cache when selecting the size of the bins. A bin creator 306 is coupled to bin size selector 302 and creates enough bins to accommodate the entire program image. The number of bins needed can be calculated, for example, by dividing the size of the entire program image by the size of each bin.

A scheduling point placement module 308 is coupled to bin creator 306 and annotated basic block flow graph 304. Scheduling point placement module 308 computes a frequency distribution from annotated basic flow graph 304, places the basic blocks into the bins to reduce switching between different bins, and creates a list of scheduling points, one such point for each exit point of each bin. Additional details regarding the operation of scheduling point placement module 308 are provided below.

A scheduling table creator 310 is coupled to scheduling point placement module 308 and annotated basic block flow graph 304. Scheduling table creator 310 creates a scheduling table associated with the program image. The scheduling table lists each scheduling point where execution should call into the drafting scheduler. The scheduling table transforms the data describing the target basic block at a scheduling point into a bin number and an entry point for the target bin. This information is used to block the thread on the appropriate scheduling queue, as described below.

Figure 4:
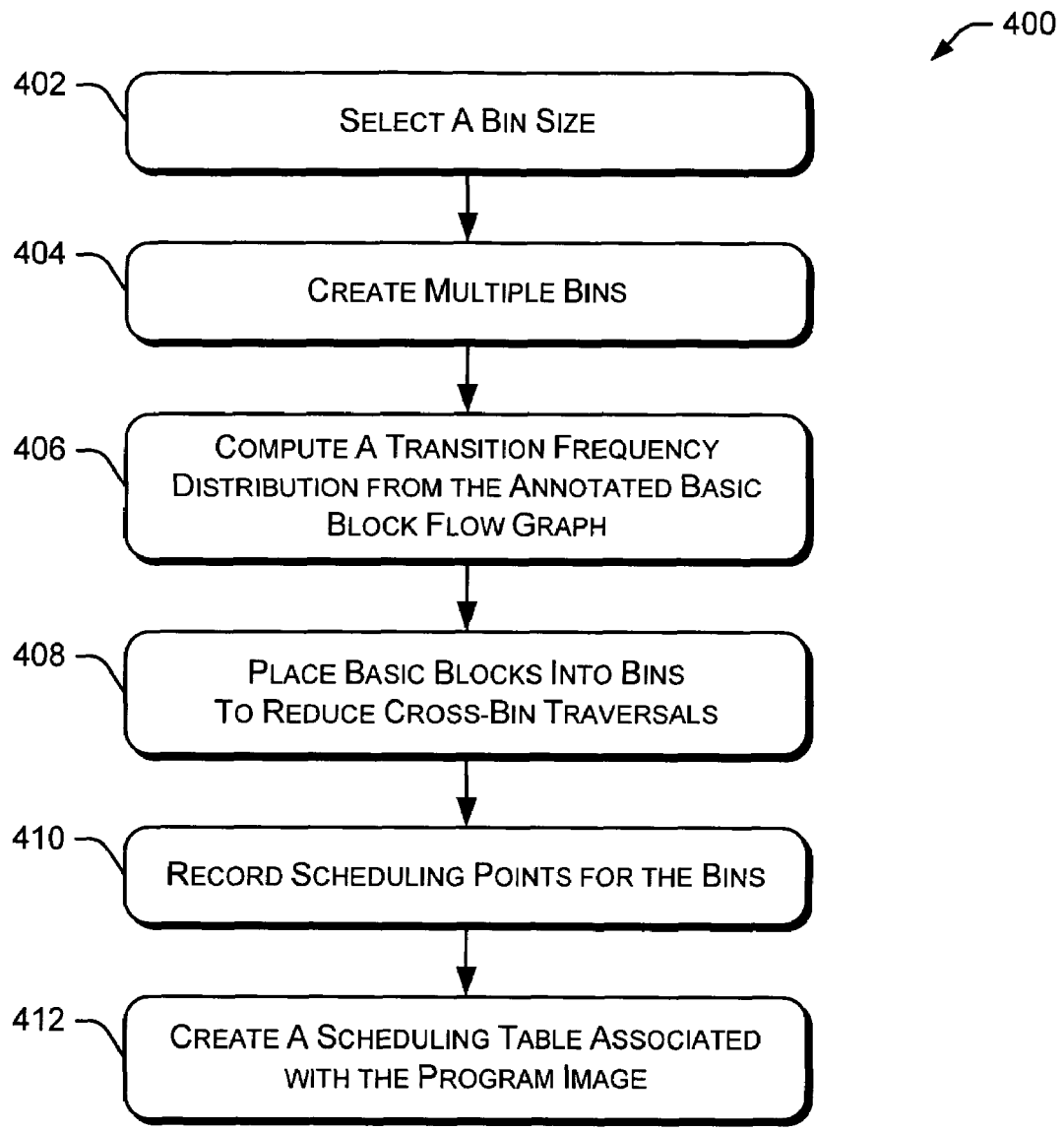
FIG. 4 is a flow diagram illustrating an embodiment of a procedure for analyzing a program image to generate an associated list of scheduling points.

FIG. 4 is a flow diagram illustrating an embodiment of a procedure 400 for analyzing a program image to generate an associated scheduling table. Initially, the procedure selects a bin size (block 402). As mentioned above, the bin size should be approximately the size of the processor cache. The procedure then creates multiple bins (block 404). The procedure creates enough bins to accommodate the entire program image. As mentioned above, the number of bins needed can be calculated by dividing the size of the entire transformed program image by the size of each bin.

Procedure 400 continues by computing a transition frequency distribution from the annotated basic block flow graph (block 406). This distribution expresses the frequency with which each transition leaving the current basic block will be followed. These frequencies are used in the block placement process.

In a particular embodiment, the basic flow graph 106 is created by first determining the number of basic blocks (n) in a program. Then, a "directed graph" on n vertices is created (with one vertex per basic block) to represent the possible execution paths. This graph is created in the following manner. The basic blocks are selected one-at-a-time (in some arbitrary order) and processed as follows: for each exit point associated with the currently selected block X, its destination block Y is identified, and an arc is drawn from the vertex associated with block X to the vertex associated with block Y. Thus, in the end, the number of arcs leaving each vertex in the graph is equal to the number of exit points of the associated basic block.

The benchmarking module 108 performs a "benchmarking" process that identifies the number of times the program arrived at each exit point during its execution. Since each exit point has a uniquely determined destination, it is possible to determine the number of times each arc in the directed graph was traversed during the benchmarking process. Thus, the arcs of the directed graph can be annotated with the number of times each arc was traversed during the benchmarking process. Specifically, a value T(A), where A is the arc number, is assigned to each arc, equal to the number of times the arc was traversed during the benchmark process. Moreover, by summing the values of T(A) on those arcs pointing to a given block, it is possible to determine the number of times the block was executed.

The procedure then places basic blocks into bins so as to increase the amount of time each thread spends in each bin. This is achieved by placing the basic blocks into bins so that the frequency of cross-bin arc traversals (block 408) is reduced. That is, basic blocks are placed into bins so as to reduce the sum of the values T(A) over the arcs that go across bins, i.e., over the arcs whose pair of basic blocks are placed in different bins.

In one embodiment, the directed graph discussed above is used to place blocks into bins. The directed graph has n vertices (the basic blocks) with weights (e.g., number of times an arc is traversed) on its edges (e.g., exit points). Each bin can hold, for example, k vertices. Each bin has a size that is close to the size of the processor's cache and can hold the code that corresponds to k basic blocks. To improve cache hit rates, it is desirable to place basic blocks in bins such that the amount of "switching" between bins is reduced. Using the model discussed above, basic blocks are placed in bins to reduce the sum of the weights on the edges that go across bins. The manner in which blocks are placed into bins may be referred to as "capacitated graph partitioning". Various articles have been written describing methods for solving such a problem. Example articles include:

Ferriera et al., "Formulations and valid inequalities for the node capacitated graph partitioning problem", Mathematical Programming, 74, pp. 247-266, 1996.

Ferriera et al., "The node capacitated graph partitioning problem: A computational study", CORE Discussion Paper, Universite Catholique de Louvain, Lovain-la-Neuve, Belgium, 1996.

E. L. Johnson, "Modeling and strong linear programs for mixed integer programming", Algorithms and Model Formulations in Mathematical Programming, NATO ASI Series 51, 1989.

Johnson et al., "Min-cut clustering", Mathematical Programming, 62, pp. 133-151, 1993.

Procedure 400 continues by recording scheduling points for the bins (block 410). To capture a thread that is about to transition out of a bin, call points are added to each transition out of a bin. These call points mark where execution should call into the drafting scheduler with an argument that identifies the target basic block. Those skilled in the art will recognize that these call points can be inserted into the program at analysis time or at runtime as function calls into the drafting scheduler. Alternatively, the drafting scheduler can be triggered by processor hardware that traps when execution reaches a specific instruction. The procedure then creates a scheduling table associated with the program image (block 412). In one embodiment, the program image is replaced with a modified program image in which a call to the scheduler is inserted at each scheduling point. In another embodiment, the program image is further modified by relocating basic blocks so that all of the blocks in the same bin are placed consecutively in the modified image to further optimize cache locality.

At runtime, threads running the program image are scheduled both by the operating system scheduler and the drafting scheduler (discussed above). The operating system scheduler initiates the execution of all threads. Threads scheduled by the operating system scheduler are launched in a typical manner, but are "captured" by the drafting scheduler. When a thread is "captured" by the drafting scheduler, the operating system scheduler relinquishes scheduling authority over the thread. When a captured thread blocks for activities such as input/output operations, the drafting scheduler is notified by the operating system of this blocking and is allowed to schedule another thread. The operating system scheduler treats all threads scheduled by the drafting scheduler as one thread. So, for example, when the operating system preempts a captured thread, it is effectively preempting all of the captured threads.

The drafting scheduler schedules all captured threads. A thread can be released from the drafting scheduler for various reasons, such as the thread has terminated, the thread has blocked on a scheduling point, or the thread has blocked on a non-scheduling point (such as an input/output operation). In the case of a terminated thread, the drafting scheduler releases the thread back to the operating system where it can be torn down. If the thread blocks on a non-scheduling point, the thread is removed from contention for draft scheduling until it is released by the operating system. The situation in which a thread blocks on a scheduling point is discussed below.

Figure 5:
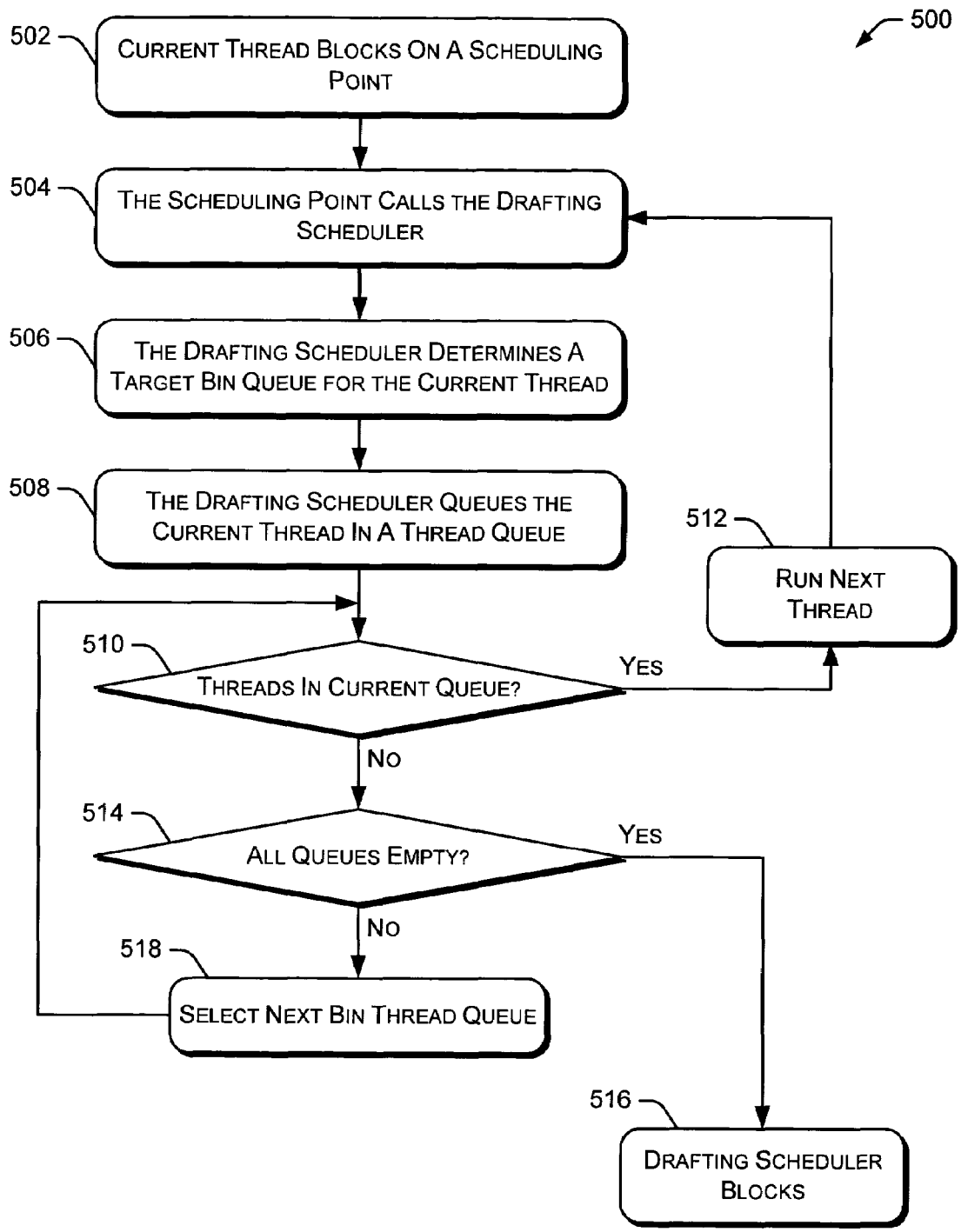
FIG. 5 is a flow diagram illustrating an embodiment of a procedure for executing a program image having an associated list of scheduling points.

FIG. 5 is a flow diagram illustrating an embodiment of a procedure 500 for executing a program image with an associated scheduling table. Initially, the program image is executed until a current thread blocks on a scheduling point (block 502). When a current thread is about to exit (i.e., transition out of) a bin, the thread will encounter a scheduling point that will call the drafting scheduler (block 504).

The drafting scheduler uses the basic block information to determine a target bin queue for the current thread (block 506). The drafting scheduler then queues the current thread in a thread queue associated with the target bin (block 508). Each bin has an associated thread queue. Queuing each blocked thread allows the drafting scheduler to control the subsequent scheduling of the thread.

After the current thread has been queued, the drafting scheduler needs to determine the next thread to run. First, Procedure 500 determines whether the current queue from which threads have been executing is empty (block 510). If threads remain in the current queue (i.e., the queue associated with the current image), the procedure runs the next thread in the current queue (block 512). The procedure continues dequeuing and running threads from the current queue until the current queue becomes empty. At this point, the procedure determines whether all queues are empty (block 514). If all queues are empty, the procedure branches to block 516, which blocks the drafting scheduler. The drafting scheduler remains blocked until the operating system scheduler informs the drafting scheduler of a change in one or more captured thread states. If, on the other hand, one or more bin queues contain threads, the procedure selects the next bin thread queue (block 518) and returns to block 510 to process the threads in the next queue.

The above process improves the hit rate of the cache (e.g., the instruction cache) because all threads in a particular bin are processed before processing threads in a different bin. The cache hit rate is improved due to the reduction in transitions between different bins since whenever such a transition occurs the cache contains a significant amount of data that is unrelated to the threads about to be executed, i.e. the threads in the current bin.

In one embodiment, the next bin queue is selected at block 518 by locating the bin queue having the most queued threads. In another embodiment, the next bin queue is selected at random among all bin queues having at least one queued thread. Periodically, the procedure may service queues having a high priority thread requesting processing. This approach ensures that high priority threads are processed without significant delay.

Figure 6A:
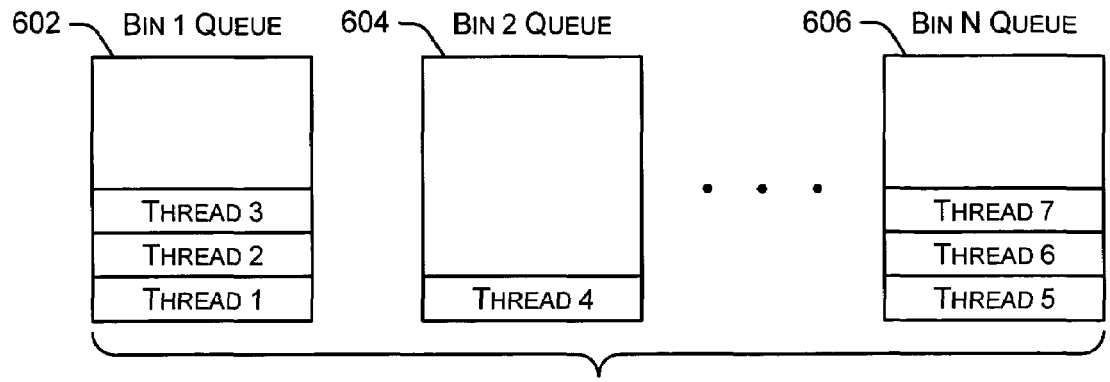
FIGS. 6A-6C illustrate multiple queues capable of storing multiple program threads.
Figure 6B:
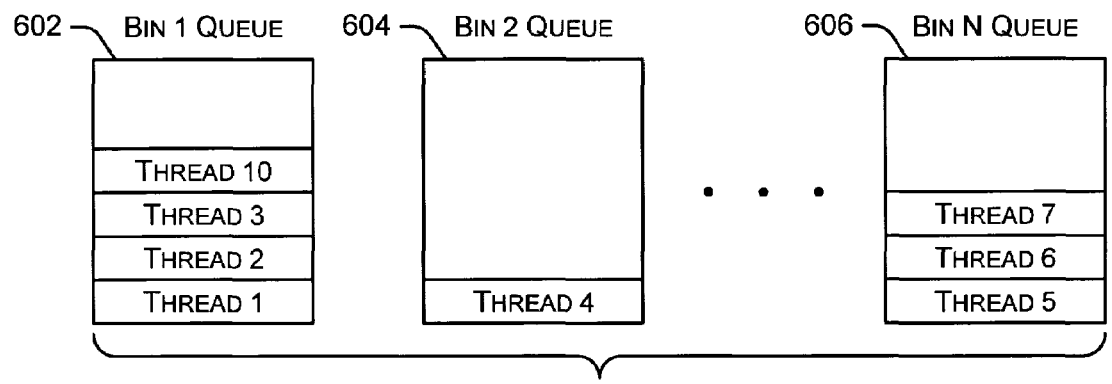
Figure 6C:
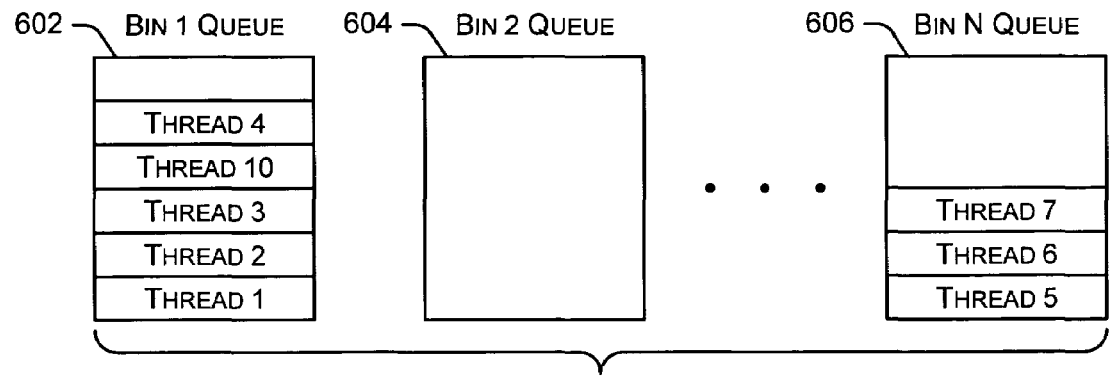

FIGS. 6A-6C illustrate multiple queues capable of storing multiple program threads. FIG. 6A illustrates three queues, a queue associated with bin 1 (having reference number 602), a queue associated with bin 2 (having reference number 604) and a queue associated with bin N (having reference number 606). In the example of FIG. 6A, Thread 1, Thread 2 and Thread 3 are queued in queue 602. Additionally, Thread 4 is queued in queue 604 and Thread 5, Thread 6 and Thread 7 are queued in queue 606. Queue 604 is the active queue in FIG. 6A. Therefore, Thread 4 is currently being executed.

FIG. 6B illustrates the same three queues as FIG. 6A, but a new thread (Thread 10) has been added to bin 602. Thread 10 was executing in another bin (not shown) and blocked on a scheduling point. Thread 10 was blocked because the thread wanted to transition to another bin (bin 1). The drafting scheduler blocked this transition and queued Thread 10 in the appropriate bin (bin 1). Queue 604 remains the active queue in FIG. 6B. Thus, Thread 4 is currently being executed.

FIG. 6C illustrates the same three queues as FIGS. 6A and 6B, but Thread 4 in queue 604 has blocked on a scheduling point. Thread 4 was blocked because the thread wanted to transition to bin 1. The drafting scheduler blocked this transition and queued Thread 4 in the queue for bin 1 (i.e., queue 602). Since queue 604 is now empty, a different queue will become the active queue. In one embodiment, the queue with the most entries becomes the active queue. In this case, queue 602 becomes the active queue because it has the most entries (of the three queues 602-606 shown in FIG. 6C). If another queue (not shown) has more entries than queue 602, that other queue would become the active queue. When queue 602 becomes the active queue, the scheduler begins executing Thread 1. When Thread 1 blocks, the scheduler queues Thread 1 to the appropriate queue, dequeues Thread 1 from queue 602, and begins executing Thread 2.

Figure 7:
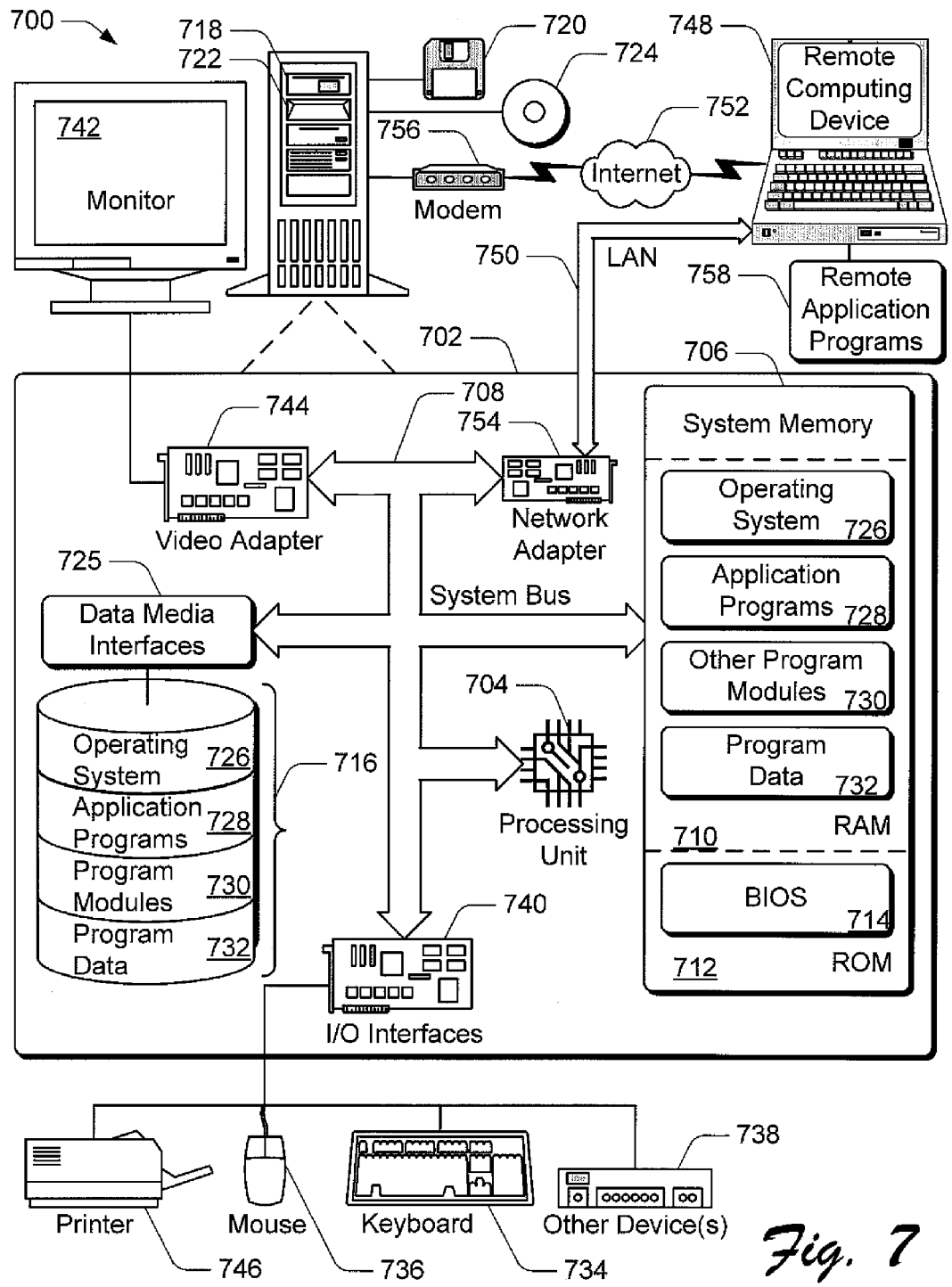
FIG. 7 illustrates an example of a computing environment.

FIG. 7 illustrates an example of a computing environment 700 within which the drafting scheduler, as well as components and architectures described herein, can be either fully or partially implemented. Exemplary computing environment 700 is only one example of a computing system and is not intended to suggest any limitation as to the scope of use or functionality of the network architectures. Neither should the computing environment 700 be interpreted as having any dependency or requirement relating to any one or combination of components illustrated in the exemplary computing environment 700.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The computing environment 700 includes a general-purpose computing system in the form of a computing device 702. The components of computing device 702 can include, by are not limited to, one or more processors 704 (e.g., any of microprocessors, controllers, and the like), a system memory 706, and a system bus 708 that couples various system components including the processor 704 to the system memory 706. The one or more processors 704 process various computer-executable instructions to control the operation of computing device 702 and to communicate with other electronic and computing devices.

The system bus 708 represents any number of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computing environment 700 typically includes a variety of computer-readable media. Such media can be any available media that is accessible by computing device 702 and includes both volatile and non-volatile media, removable and non-removable media. The system memory 706 includes computer-readable media in the form of volatile memory, such as random access memory (RAM) 710, and/or non-volatile memory, such as read only memory (ROM) 712. A basic input/output system (BIOS) 714, containing the basic routines that help to transfer information between elements within computing device 702, such as during start-up, is stored in ROM 712. RAM 710 typically contains data and/or program modules that are immediately accessible to and/or presently operated on by the processing unit 704.

Computing device 702 can also include other removable/non-removable, volatile/non-volatile computer storage media. By way of example, a hard disk drive 716 is included for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD, or any other type of optical media. The hard disk drive 716, magnetic disk drive 718, and optical disk drive 722 are each connected to the system bus 708 by one or more data media interfaces 725. Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer-readable instructions, data structures, program modules, and other data for computing device 702. Although the example illustrates a hard disk 716, a removable magnetic disk 720, and a removable optical disk 724, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of the systems and methods for a test instantiation system.

Computing device 702 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 702 via input devices such as a keyboard 734 and a pointing device 736 (e.g., a "mouse"). Other input devices 738 (not shown specifically) may include a microphone, joystick, game pad, controller, satellite dish, serial port, scanner, and/or the like. These and other input devices are connected to the processing unit 704 via input/output interfaces 740 that are coupled to the system bus 708, but may be connected by other interface and bus structures, such as a parallel port, game port, and/or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computing device 702 via the input/output interfaces 740.

Computing device 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computing device 702.

Logical connections between computing device 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computing device 702 is connected to a local network 750 via a network interface or adapter 754. When implemented in a WAN networking environment, the computing device 702 typically includes a modem 756 or other means for establishing communications over the wide network 752. The modem 756, which can be internal or external to computing device 702, can be connected to the system bus 708 via the input/output interfaces 740 or other appropriate mechanisms. It is to be appreciated that the illustrated network connections are exemplary and that other means of establishing communication link(s) between the computing devices 702 and 748 can be employed.

In a networked environment, such as that illustrated with computing environment 700, program modules depicted relative to the computing device 702, or portions thereof, may be stored in a remote memory storage device. By way of example, remote application programs 758 reside on a memory device of remote computing device 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   identifying a program image;
   generating a basic block flow graph associated with the program image;
   benchmarking execution of the program image;
   annotating the basic block flow graph with results from benchmarking execution of the program image, wherein the annotating comprises one or more of a plurality of items of information, wherein the plurality of items of information comprises:
   a number of times each basic block was entered; and
   a percentage of times the program image exited each basic block using each alternate exit path;
   creating a plurality of bins, wherein each bin is sized by approximating a size of a processor cache;

placing, based the annotation of at least a frequency for traversing each transition leaving a particular basic block, each of the basic blocks from the basic block flow graph into one of the plurality of bins;

adding a plurality of scheduling points to the program image, wherein each scheduling point will trigger a call to a drafting scheduler, the call identifying a target basic block; and generating a scheduling table representing the program image containing a plurality of scheduling points, wherein the scheduling table transforms the data describing the target basic block at a scheduling point into a representation of the bin containing the target basic block and an entry point for the target bin.

2. A method as recited in claim 1 wherein at least one of a plurality of identifiers associated with the plurality of scheduling points are stored in the scheduling table.

3. A method as recited in claim 1 wherein annotating the basic block flow graph includes adding information regarding the size of each basic block.

4. A method as recited in claim 1 wherein the drafting scheduler, in response to receiving a call identifying a target basic block, determines whether any additional blocks are waiting in the bin from which the call is originating;

in an event that at least one block is waiting in the bin from which the call is originating, scheduling a waiting block;

in an event that no block is waiting in the bin from which the call is originating, scheduling based on information in the scheduling table and the annotation information, a next basic block in a next bin.

5. A method as recited in claim 1 wherein the drafting scheduler relinquishes control to an operating system in an event of an input/output operation.

6. A method as recited in claim 1 wherein the drafting scheduler is periodically preempted for high priority threads.

7. A method as recited in claim 1, wherein the program image is replaced with a modified program image in which a call to a scheduler is inserted at each scheduling point.

8. A method as recited in claim 1 wherein the basic blocks are placed into the plurality of bins in a manner that reduces transitions between bins.

9. One or more computer-readable memories containing a computer program that is executable by a processor to perform the method recited in claim 1.

10. A method comprising:
analyzing a program image;
generating a basic block flow graph associated with the program image;
benchmarking execution of the program image;
annotating the basic block flow graph with results from benchmarking execution of the program image, wherein the annotating comprises one or more of the plurality of items of information, wherein the plurality of items of information comprises:
a number of times each basic block was entered; and
a percentage of times the program image exited each basic block using each alternate exit path;
creating a plurality of bins, wherein each bin is sized by approximating a size of a processor cache; and
placing, based the annotation of at least a frequency for traversing each transition leaving a particular basic block, each of the basic blocks from the basic block flow graph into one of the plurality of bins, based on the analysis of the program image so that the use of one or more processor caches is enhanced; and adding a plurality of scheduling points to the program image, wherein each scheduling point will trigger a call to a drafting scheduler, the call identifying a target basic block; and creating a list of scheduling points associated with the plurality of bins, wherein the list of scheduling points transforms the data describing the target basic block at a scheduling point into a representation of the bin containing the target basic block and an entry point for the target bin.

11. A method as recited in claim 10 further comprising executing thread blocks when encountering a scheduling point.

12. A method as recited in claim 10 wherein placing each of the basic blocks from the basic block flow graph into one of the plurality of bins includes placing the basic blocks based on their temporal locality.

13. One or more computer-readable memories containing a computer program that is executable by a processor to perform the method recited in claim 10.

14. An apparatus comprising:
a processing unit;
a system memory coupled to the processing unit storing at least one of a plurality of modules, the modules comprising:
a program analysis module configured to receive a program image and to generate a basic block flow graph associated with the program image;
a benchmarking module coupled to the program analysis module, the benchmarking module to benchmark execution of the program image and to annotate the basic block flow graph with results from the benchmark execution of the program image, wherein annotating comprises one or more of a plurality of items of information, wherein the plurality of items of information comprises:
a number of times each basic block was entered; and
a percentage of times the program image exited each basic block using each alternate exit path; and
a binning module coupled to the benchmarking module and configured to:
generate a scheduling table containing a plurality of scheduling points, wherein the scheduling table transforms the data describing the target basic block at a scheduling point into a representation of the bin containing the target basic block and an entry point for the target bin;
create a plurality of bins, wherein each bin is sized by approximating a size of a processor cache;
place each of the basic blocks from the basic block flow graph into one of the plurality of bins, based on the annotation of at least a frequency for traversing each transition leaving a particular basic block; and
add a plurality of scheduling points to the program image, wherein each scheduling point will trigger a call to a drafting scheduler, the call identifying a target basic block.

15. An apparatus as recited in claim 14 wherein the apparatus is a drafting scheduler.

16. An apparatus as recited in claim 14 wherein the binning module further creates a plurality of bins and places each of the basic blocks in the basic block flow graph into one of the plurality of bins.

* * * * *